United States Patent
Adams et al.

(10) Patent No.: US 7,855,997 B2
(45) Date of Patent: Dec. 21, 2010

(54) LONG RANGE SCHEDULING FOR DIRECTIONAL ANTENNA MANET NETWORKS

(75) Inventors: Stanley L. Adams, Harbor Beach, FL (US); Keith A. Olds, Melbourne, FL (US); Joseph B. Cain, Indialantic, FL (US); Michael R. James, W. Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 811 days.

(21) Appl. No.: 11/832,202

(22) Filed: Aug. 1, 2007

(65) Prior Publication Data
US 2009/0034489 A1 Feb. 5, 2009

(51) Int. Cl.
*H04W 24/02* (2009.01)
*H04W 28/08* (2009.01)
*H04W 28/12* (2009.01)
*H04W 72/12* (2009.01)
*H04B 7/212* (2006.01)
*H04B 15/00* (2006.01)
*H04Q 11/04* (2006.01)

(52) U.S. Cl. .............. 370/337; 370/339; 370/278; 370/280; 370/294; 370/338; 370/442; 455/453

(58) Field of Classification Search .............. 370/277, 370/278, 280, 294, 310, 337, 338, 339, 347, 370/348, 442, 443; 455/9, 10, 25, 73, 500, 455/501, 456.1, 453
See application file for complete search history.

(56) References Cited

U.S. PATENT DOCUMENTS

| | | | |
|---|---|---|---|
| 5,751,709 A | 5/1998 | Rathnavelu | |
| 5,914,934 A | 6/1999 | Rathnavelu | |
| 6,205,118 B1 | 3/2001 | Rathnavelu | |
| 6,331,974 B1 | 12/2001 | Yang et al. | |
| 6,665,311 B2 * | 12/2003 | Kondylis et al. | 370/462 |
| 6,788,702 B1 * | 9/2004 | Garcia-Luna-Aceves et al. | 370/458 |
| 6,798,761 B2 | 9/2004 | Cain et al. | |
| 6,804,208 B2 | 10/2004 | Cain et al. | |
| 6,901,064 B2 | 5/2005 | Cain et al. | |
| 6,904,032 B2 | 6/2005 | Cain | |
| 6,954,449 B2 | 10/2005 | Cain et al. | |
| 6,958,986 B2 | 10/2005 | Cain | |
| 6,982,987 B2 | 1/2006 | Cain | |

(Continued)

OTHER PUBLICATIONS

Vanwiggeren, et al., "Chaotic Communication Using Time-Delayed Optical Systems," International Journal of Bifurcation and Chaos, vol. 9, No. 11 (1999) pp. 2129-2156, World Scientific Publishing Co.

(Continued)

*Primary Examiner*—Chi H Pham
*Assistant Examiner*—Ahmed Elallam
(74) *Attorney, Agent, or Firm*—Fox Rothschild, LLP; Robert J. Sacco

(57) ABSTRACT

Method and apparatus for scheduling time division multiple access (TDMA) communications among a plurality of peer nodes arranged to form a wireless ad hoc mobile network. The peer nodes communicate with each other using directional antennas and a TDMA process. The method includes a scheduling process for scheduling at least one transmit time slot during which a first one of the plurality of peer nodes transmits wireless data to a second one of the plurality of peer nodes.

16 Claims, 12 Drawing Sheets

U.S. PATENT DOCUMENTS

| | | | |
|---|---|---|---|
| 7,027,409 B2 | 4/2006 | Cain | |
| 7,068,605 B2 | 6/2006 | Cain et al. | |
| 7,076,065 B2 | 7/2006 | Sherman et al. | |
| 7,079,552 B2 | 7/2006 | Cain et al. | |
| 7,085,290 B2 | 8/2006 | Cain et al. | |
| 7,133,931 B1 | 11/2006 | Allison et al. | |
| 7,304,972 B2* | 12/2007 | Cain et al. | 370/338 |
| 7,333,458 B2* | 2/2008 | Cain | 370/337 |
| 7,583,641 B2* | 9/2009 | Lord | 370/337 |
| 7,630,349 B2* | 12/2009 | Freedman et al. | 370/338 |
| 7,639,652 B1* | 12/2009 | Amis et al. | 370/337 |
| 7,639,708 B1* | 12/2009 | Snodgrass et al. | 370/458 |
| 7,778,219 B2* | 8/2010 | Zhang | 370/329 |
| 2002/0167960 A1* | 11/2002 | Garcia-Luna-Aceves | 370/442 |
| 2003/0096613 A1* | 5/2003 | Das et al. | 455/450 |
| 2003/0179756 A1* | 9/2003 | Cain | 370/395.42 |
| 2003/0214914 A1* | 11/2003 | Cain | 370/252 |
| 2004/0032847 A1* | 2/2004 | Cain | 370/338 |
| 2007/0087758 A1* | 4/2007 | Norris et al. | 455/456.1 |
| 2007/0140127 A1* | 6/2007 | Frei | 370/238 |
| 2007/0274346 A1* | 11/2007 | Lord | 370/498 |
| 2007/0280163 A1* | 12/2007 | Zhang | 370/331 |
| 2008/0008137 A1* | 1/2008 | Robinson | 370/338 |
| 2008/0107044 A1* | 5/2008 | Blair et al. | 370/256 |
| 2008/0144493 A1* | 6/2008 | Yeh | 370/230 |
| 2008/0310390 A1* | 12/2008 | Pun et al. | 370/347 |

OTHER PUBLICATIONS

Morsche, et al., "Signals and Systems," lecture notes, University of Eindhoven, The Netherlands, 1999.

* cited by examiner

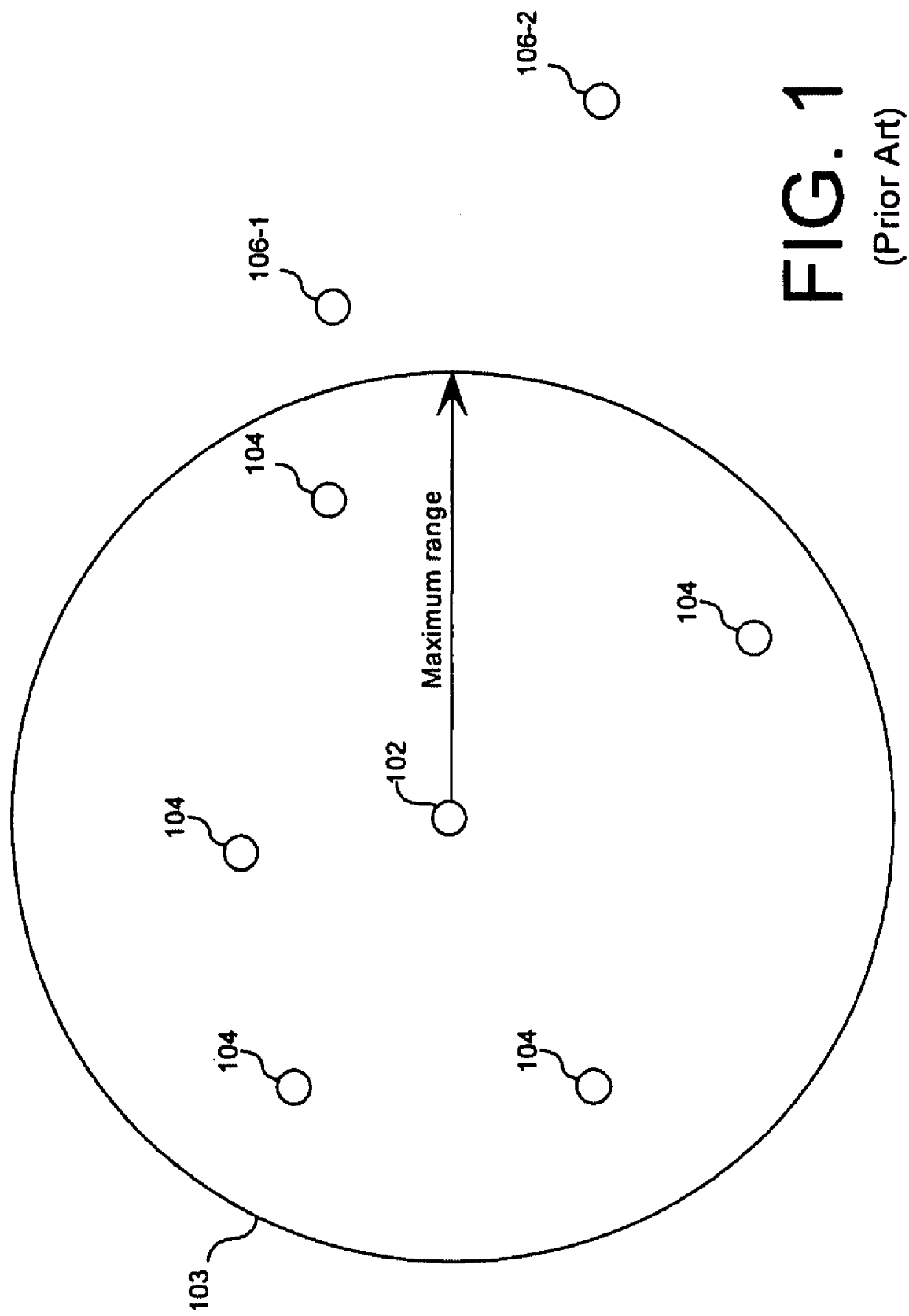

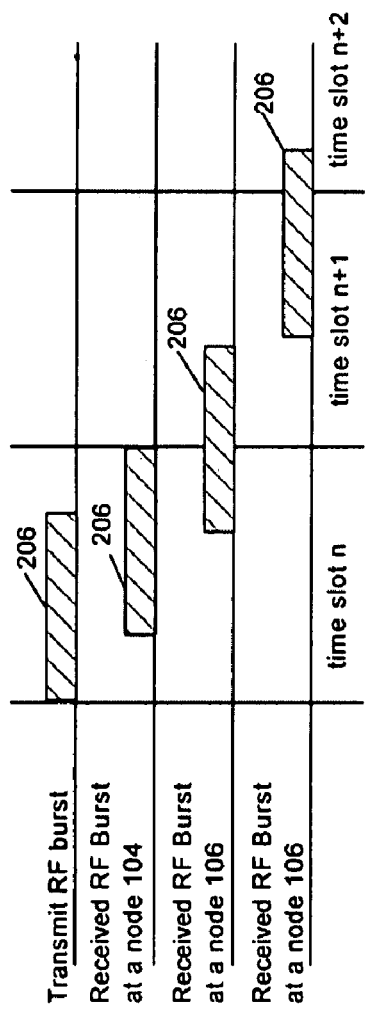
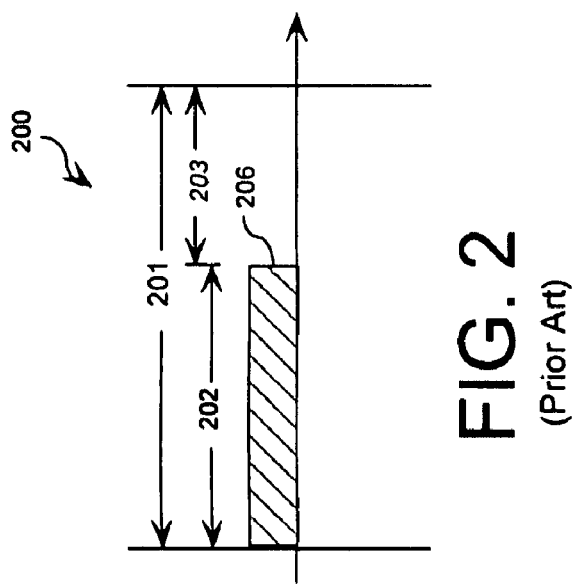

LONG RANGE SCHEDULING FOR DIRECTIONAL ANTENNA MANET NETWORKS

BACKGROUND OF THE INVENTION

1. Statement of the Technical Field

The inventive arrangements relate to directional networks that can cover terrestrial and airborne nodes over hundreds of nautical miles, and more particularly to long range TDMA time slot scheduling in peer-to-peer directional networks.

2. Description of the Related Art

Peer-to-peer mobile ad hoc networks (MANET) using directional antennas are known in the art. These MANET networks can use a variety of communications formats including Time Division Multiplexed Access (TDMA) arrangements. Further, they are characterized by independence from fixed infrastructures and by peer-to-peer distributed control mechanisms and protocols. In TDMA type MANET networks, each node can communicate during a specified time period or time slot. In order to coordinate such communications, each node can include a clock which is synchronized with a highly stable time reference. For example, this stable time reference can be derived from a satellite-based GPS signal. It should be noted that TDMA cellular systems often rely on synchronization to base stations to establish system timing and to compensate for propagation delay differences. Such TDMA cellular systems include, but are not limited to, global systems for mobile communications (GSM), Integrated Digital Enhanced Network (iDENs) systems, 802.16 based broadband wireless access network systems, and TDMA satellite communications (SATCOM) systems.

Still, each TDMA node can be expected to have a significant total time base uncertainty. Also, propagation delay between nodes can create additional timing uncertainties that change in real time as the mobile nodes move relative to one another. In order to manage these timing uncertainties, prior art systems use a base station infrastructure to create a hub and spoke typology. These base stations are usually, but not necessarily, fixed in location. The mobile nodes operate as "spokes" or "clients" to the basestation hubs and synchronize their transmissions to those base stations.

A MANET is an infrastructureless network that uses peer-to-peer control mechanisms and therefore does not have base stations to provide a central timing reference. Therefore, there is a need in a TDMA MANET for a new time synchronization method that can compensate for variable propagation delay and other propagation uncertainty in the absence of a central infrastructure.

In a TDMA MANTET, a transmitted RF burst is can be transmitted within a time slot as close to the beginning of the time slot as possible. The time slot length can be selected to exceed the maximum RF burst length by an amount of time referred to as the "guard time." This guard time is used to accommodate any timing uncertainties at either the transmitter or receiver, and the maximum propagation time delay. If the range delay between the transmit node and the receive node exceeds the allocation in the guard time, a maximum length RF burst will spill over into the following time slot at the receiver. This spillover can cause interference if such following time slot is in use for communications as between other nodes.

Conventional MANET networks using TDMA generally choose a guard time which is based (at least in part) on the maximum permitted range between nodes. In this regard, networks which are designed to accommodate larger distances between nodes can require larger guard times. These larger guard times are necessary to accommodate potentially longer propagation delays between distant nodes. This approach can provide acceptable results for a limited network range. However, for networks operating over hundreds of nautical miles, the guard time can become relatively lengthy in duration. Such lengthy guard periods restrict the available time for other nodes to communicate with each other, leading to inefficiencies in the overall network. For example, a system which has 88% efficiency with an operating range of 11 nautical miles can have an efficiency of only 16% if the operating range is extended to 440 nautical miles.

In order to address this problem, several existing TDMA wireless systems have used range adjusted timing systems. However, such systems have generally only been applied in hub-spoke type networks. The problem becomes more considerably more complex in the case of ad-hoc peer-to-peer networks. Accordingly, a new approach is needed for ad-hoc peer-to-peer communications networks to facilitate TDMA communications which are capable of providing efficient communications over larger geographic areas.

SUMMARY OF THE INVENTION

The invention concerns a method and apparatus for scheduling time division multiple access (TDMA) communications among a plurality of nodes arranged to form a wireless ad hoc mobile network. The nodes communicate with each other using directional antennas and a TDMA scheduling process. The nodes have knowledge of the range between the transmitting node and other nodes within the radio line of sight of the transmitting node. The method includes a scheduling process for scheduling at least one transmit time slot during which a first one of the plurality of nodes transmits wireless data to a second one of the plurality of nodes. The scheduling process includes automatically selecting a candidate time slot for the transmit time slot. The scheduling process also includes determining whether transmissions during the candidate time slot will (1) cause interference with communications of any of the plurality of nodes that are located in a defined transmit antenna beam of the first node, or (2) be subject to interference when received at the second node as a result of transmissions from any of the plurality of nodes located in a defined receive antenna beam of the second node.

A data epoch is defined for the TDMA process. The data epoch includes a recurring time period which defines an overall timing cycle for the TDMA process. Each data epoch is sub-divided in time to form a plurality of mini-slots, each comprising a fractional duration of the data epoch. The scheduling process includes selecting the candidate time slot to have a duration which includes a plurality of M contiguous mini-slots. The scheduling process further includes automatically selecting the candidate time slot to include any contiguous group of M mini-slots contained within the data epoch.

The scheduling step further includes automatically selecting a receive time slot for the second node. The receive time slot length corresponds to the transmit time slot, but the arrival time is automatically adjusted in time to compensate for a propagation delay between the first node and the second node, which is directly known a priori or derived from prior knowledge of the range between the nodes. In this regard, the receive time slot can comprise a different contiguous group of mini-slots as compared to the transmit time slot. Significantly, the second node automatically determines the receive time slot exclusive of any centralized controller for the mobile ad hoc network. According to a preferred embodiment, the scheduling process is a distributed process which is cooperatively performed in a process which involves at least at the first node and the second node.

The scheduling step further includes automatically selecting an alternative candidate time slot. For example, the alternative candidate time slot will be selected if it is determined that transmissions from the first node to the second node during the initially selected candidate time slot will (1) cause interference with communications of any of the plurality of nodes that are located in the defined transmit antenna beam of the first node, or (2) be subject to interference when received at the second node as a result of transmissions from any of the plurality of nodes located in the defined receive antenna beam of the second node.

The method also includes a second scheduling step. The second scheduling step involves scheduling at least a second transmit time slot during which the second one of the plurality of nodes to transmit wireless data to the first one of the plurality of nodes. The second scheduling step also makes use of a distributed scheduling process. The second scheduling step includes automatically selecting a second candidate time slot for the second transmit time slot and determining whether transmissions during the second candidate time slot will (1) cause interference with communications of any of the plurality of nodes that are located within the radio line of sight of the second node, or (2) be subject to interference when received at the first node as a result of transmissions from any of the plurality of nodes located in a defined receive antenna beam of the first node. If the nodes use directional antennas, then this step includes a consideration of the antenna pattern and beam location when the potential to cause interference is evaluated.

The inventive arrangements also include an alternative method for scheduling time division multiple access (TDMA) communications among a plurality of nodes using directional antennas in a mobile ad hoc network. The alternative method includes arranging a plurality of nodes to form a wireless ad hoc mobile network. The nodes communicate with each other using directional antennas and a TDMA process. The method includes using a peer-to-peer distributed scheduling process. The distributed scheduling process includes automatically scheduling for each node at least one transmit time slot for transmitting wireless data to a neighboring one of the plurality of nodes. The method also includes automatically scheduling for each node a receive time slot for receiving signals transmitted from a neighboring one of the plurality of nodes during a respective one of the transmit time slots. Significantly, each of the receive time slots corresponds to a time of a respective one of the transmit time slots, but is automatically adjusted delayed in time to compensate for a propagation delay between nodes.

The scheduling step further includes automatically selecting at each node a candidate time slot for the transmit time slot and determining whether transmissions during the candidate time slot will (1) cause interference with communications of any of the plurality of nodes that are located in a defined transmit antenna beam of the node, or (2) be subject to interference when received at the neighboring node resulting from transmissions from any of the plurality of nodes located in a defined receive antenna beam of the neighboring node.

In the alternative embodiment, a data epoch is defined for the TDMA process. The data epoch includes a recurring time period which defines an overall timing cycle for the TDMA system. Each data epoch is sub-divided in time to form a plurality of mini-slots, each comprising a fractional duration of the data epoch. Significantly, the transmit time slot is selected to have a duration which includes a plurality of M contiguous mini-slots. The scheduling process further includes automatically selecting the transmit time slot to include any contiguous group of M mini-slots contained within the data epoch.

According to yet another embodiment, the invention includes a distributed system for scheduling time division multiple access (TDMA) communications among a plurality of nodes using any combination of omni or directional antennas in a mobile ad hoc network. The system includes a plurality of nodes arranged to form a wireless ad hoc mobile network that communicate with each other using directional antennas and a TDMA process. A processor for performing scheduling functions is provided at each node. The processor at each node cooperates with processors at other nodes to cooperatively schedule at least one transmit time slot during which a first one of the plurality of nodes transmits wireless data to a second one of the plurality of nodes. The processor is further configured to automatically select a candidate time slot for the transmit time slot. The processor cooperates with at least one other processor in another node to determine whether transmissions during the candidate time slot will (1) cause interference with communications of any of the plurality of nodes that are located in a defined transmit antenna beam of the first node, or (2) be subject to interference when received at the second node resulting from transmissions from any of the plurality of nodes located in a defined receive antenna beam of the second node.

The TDMA process includes a data epoch comprising a recurring time period which defines an overall timing cycle for the TDMA process. Each data epoch is sub-divided in time to form a plurality of mini-slots, each comprising a fractional duration of the data epoch. The processor in each node that is used for scheduling processing is configured for selecting the candidate time slot to have a duration which includes a plurality of M mini-slots. Notably, the processor is configured to automatically select the candidate time slot to include any contiguous group of M mini-slots contained within the data epoch.

The processor at each node is also configured to automatically select a receive time slot for the second node corresponding to a time of the transmit time slot, wherein the receive time slot is automatically adjusted in time to compensate for a propagation delay between the first node and the second node. Significantly, the processor used for scheduling at the second node automatically determines the receive time slot exclusive of any centralized controller for the mobile ad hoc network. The receive time slot includes a different contiguous group of mini-slots as compared to the transmit time slot.

The TDMA process includes a "neighbor database" at each node that maintains knowledge of the location of or equivalently the relative range and angles between the plurality of nodes within the radio line of sight of the first node. The neighbor database also includes knowledge of the currently scheduled transmit and receive timeslots at the plurality of nodes included in the neighbor database.

The TDMA process includes a method for populating the database of node locations of the plurality of nodes. Those skilled in the art will appreciate that there are numerous methods available to populate a database with this information. The methods include broadcast or multicast transmissions between the nodes or downloads from an external source.

BRIEF DESCRIPTION OF THE DRAWINGS

FIG. 1 is a drawing that is useful for understanding timing problems which occur in mobile ad hoc networks.

FIG. 2 is a timing diagram that is useful for understanding timing problems which occur in mobile ad hoc networks.

FIG. 3 is a timing diagram that is useful for understanding timing problems which occur in mobile ad hoc networks.

DETAILED DESCRIPTION OF THE PREFERRED EMBODIMENTS

Figure 4:
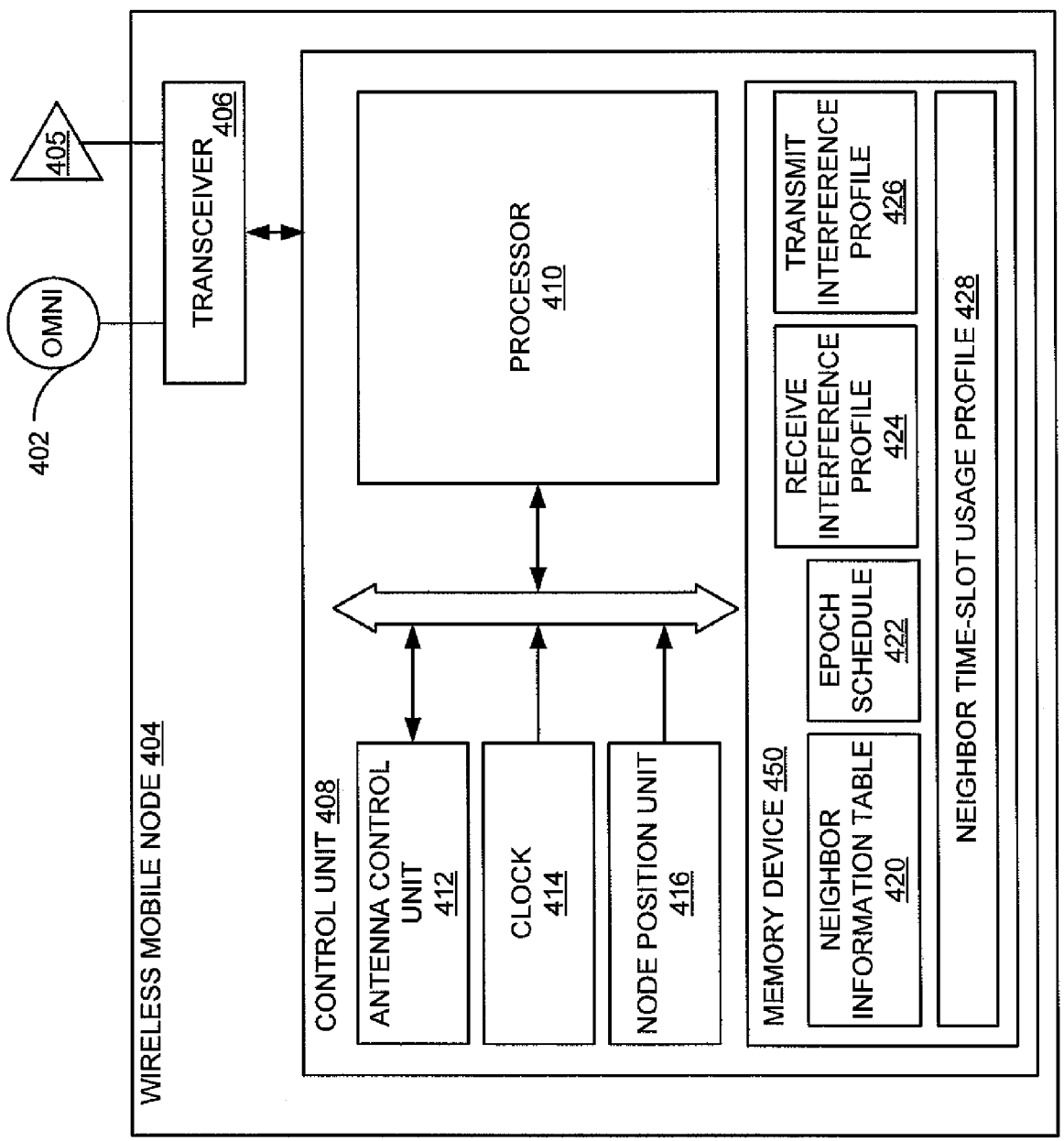
FIG. 4 is a block diagram of a wireless mobile node that can be used to implement the present invention.

Conventional approaches to peer-to-peer, ad-hoc TDMA communication networks are based on knowing only the maximum range between nodes. This concept is illustrated in FIGS. 1-3. FIG. 1 shows a two-dimensional layout of a group of nodes in a prior art TDMA based mobile ad hoc network (MANET). In FIG. 1, the transmitting node is node 102. In this example, the system has a guard time that is designed to accommodate maximum range indicated by the radius of the circle 103. Nodes 104 are within this radius. Node 106-1 is outside this radius. Node 106-2 is further outside the radius as compared to node 106-1.

Referring now to FIG. 2 there is shown a conventional time slot 200. The time slot has a duration 201, a maximum RF burst time 202, and a guard time 203. The guard time is provided to accommodate range uncertainty as well as other timing uncertainties at the receiver and transmitter. An RF burst 206 is shown within the maximum burst time 202. Referring again to FIG. 1, it can be understood that transmissions from node 102 to node 106-1 or 106-2, which are of the maximum RF burst length, will contaminate the following (or later) time slot for node 106-1, 106-2 because these nodes are each located beyond the radius of the maximum range circle 103.

An alternative illustration of the foregoing concept is provided in FIG. 3. The transmit RF burst 206 of maximum length is shown in time slot n. At a node 104 the RF burst 206 arrives within slot n because node 104 is within the maximum guard time protected range. When RF burst 206 is received at a node 106-1 (beyond maximum protected range) the transmission will cause interference for node 106-1 in time slot n+1. At a more distant node 106-2, the transmission will cause interference in time slot node n+2. As will be appreciated by those skilled in the art, transmitted RF bursts 206 that are not of maximum length may or may not contaminate the following time slot(s).

In FIGS. 1-3, the length of the guard period 203 can be defined so that it comprises a greater portion of the total time 201 comprising time slot 200. Increasing the length of time of the guard period in this way can allow more distant nodes, such as nodes 106-1, 106-2 to receive the RF burst 206 within the guard period for a time slot n. Thus, if it is known that the network must cover a larger area, a longer guard period can be selected. However, it will be appreciated that increasing the guard period in this way will decrease the time available for the RF burst 206. This has the undesirable effect of reducing efficiency.

The invention will now be described more fully hereinafter with reference to accompanying drawing FIGS. 4-15, in which illustrative embodiments of the invention are shown. This invention, may however, be embodied in many different forms and should not be construed as limited to the embodiments set forth herein.

In order to overcome the deficiencies of the prior art, an embodiment of the invention includes a peer-to-peer TDMA type mobile ad hoc network comprised of a plurality of individual nodes. The individual nodes communicate with each other within an ad-hoc network environment. Significantly, information concerning the range between node pairs is estimated and exploited. Consequently, the scalability, latency, and efficiency of the TDMA communication system can be significantly enhanced.

The inventive arrangements advantageously include a distributed long range scheduler function as part of each node. The distributed long range scheduler determines specific times when node pairs can communicate so as to avoid interfering with one another. Heuristics produce an efficient distributed schedule for communication between node pairs. This schedule is advantageously based on information which includes both node range and angle (i.e. direction). Accurate time references are provided at each node and nodes exchange position estimates so that each node can maintain an estimate of range to its various neighbors. Further, unlike conventional arrangements which provide a time axis measured in fixed time slots per epoch, the inventive arrangements make use of a plurality of mini-slots. A plurality of mini-slots can be arbitrarily selected to define a time slot which is thereafter used for communications from one node to another node. The time slot is independently evaluated by each node to determine whether its use will cause interference with neighboring nodes. Each node independently adjusts its schedule to account for the link delay. Further, transmit and receive time slots are scheduled separately to allow for more efficient use of available time.

Referring now to FIG. 4, there is provided a simplified block diagram for a wireless mobile node 404 that is useful for understanding the present invention. The wireless mobile node can be used in a wireless communication network as described herein. The wireless mobile node 404 is comprised of a directional antenna 405, a transceiver 406, and a control unit 408. The wireless mobile node 404 can optionally include an omni-directional antenna 402.

The transceiver 406, the omni-directional antenna 402 and the directional antenna 405 collectively enable wireless communications between the wireless mobile node 404 and a plurality of other nodes having a similar configuration in the network. In this regard, it should be appreciated that the omni-directional antenna 402 is configured to send and/or receive signals in any direction. The directional antenna 405 is configured to selectively send and/or receive signals in a desired direction. The directional antenna 405 can include, but is not limited to, a phased array antenna. The omni-directional antenna 402 and directional antenna 405 are coupled to the transceiver 406 so that RF signals can be communicated to and from each of these antennas. In an alternative embodiment, the omni-directional antenna 402 can be omitted and omni-directional communications can be provided by scanning a directional antenna beam through a wide range of azimuth and elevation angles.

The transceiver 406 can include conventional RF circuitry (not shown) and a modem (not shown) for receiving and transmitting RF signals. The transceiver 406 is electrically connected to the unit 408 so that received signals demodulated by the transceiver 406 can be communicated to the control unit 408. Similarly, baseband digital data and control signals can be communicated from the control unit 408 to the transceiver 406.

The control unit 408 is comprised of processor 410, antenna control unit 412, a clock 414, and node position unit 416. The antenna control unit 412 can control a direction of an antenna beam associated with the directional antenna 405. The antenna control unit 412 can optionally be included as part of the transceiver 406. Clock 414 provides a highly accurate and stable time reference for each node. The accuracy of the clock 414 can be maintained by any suitable means. For example, a GPS timing signal can be used for this purpose. As will be appreciated by those skilled in the art, GPS timing signals can provide a highly accurate time reference. Thus, clock 414 can be synchronized with clocks of other wireless mobile nodes forming part of the network described herein. The clocks are preferably synchronized to within a fractional portion of a mini time-slot (described below in greater detail). According to one embodiment, the time references can advantageously be selected so that a clock 414 associated with each wireless mobile node 404 is synchronized to within 100 nanoseconds of other nodes in the network. Still, the invention is not limited in this regard.

The control unit 408 also includes a node position unit 416. The node position unit 416 is configured to allow the wireless mobile node 404 to identify its position. For example, the node position unit 416 can advantageously include a GPS receiver and GPS processing circuitry suitable for allowing the wireless mobile node 404 to precisely locate its position at any terrestrial or airborne location. If a GPS receiver is used, the GPS timing data can be used as described above to aid in synchronizing the clocks 414 in each of the wireless mobile nodes 404.

The control unit 408 also includes a memory device 450. The memory device 450 stores several different types of information. For example, the memory device 450 can includes a neighbor information table 420, epoch schedule 422, a receive (Rx) interference profile 424, a transmit (Tx) interference profile 426, and a neighbor time-slot usage profile 428. The various types of information stored in memory device 450 will be discussed below in greater detail. The various components forming the control unit 408 can communicate with each other by means of a suitable data bus 418.

Those skilled in the art will appreciate that the architecture described herein for wireless mobile node 404 is one possible example of a wireless mobile node which can be used with the present invention. However, it should be understood that the invention is not limited in this regard. Instead, any other suitable wireless mobile node architecture can also be used without limitation.

An overview of the basic operation of wireless mobile network utilizing a plurality of wireless mobile nodes 404 according to the inventive arrangements will now be provided. According to an embodiment of the invention, individual network nodes 404 use a neighbor discovery process. The neighbor discovery process includes an exchange of position information so that each node has the coordinates of neighboring nodes. This position information allows the range information and relative direction of such neighbor nodes to be calculated. Range information and direction information is used for purposes of performing interference calculations. Interference calculations also include consideration of propagation delays between nodes and required antenna beam pointing directions based on the known node locations.

The present invention is unlike conventional MANET systems that utilize conventional TDMA technology. In such conventional TDMA systems, periods of time are divided into epochs, and communication between nodes occurs in time slots which are sub-portions of each epoch. Significantly, each time slot in a conventional system will have a fixed timing position in each epoch. Nodes in the ad hoc network which need to communicate are assigned time slots for such communications. However, this fixed timing creates problems for long range communications.

The present invention also divides time into a series of epochs. However, the timing of the time slots used for communications between nodes is not fixed. State differently, it can be said that the timing position of each time slot is not fixed within each epoch. In the present invention, the position of time slots within each epoch can be arbitrarily selected by the nodes in accordance with an algorithm. The algorithm is selected for minimizing potential interference among neighbor nodes.

Figure 5:
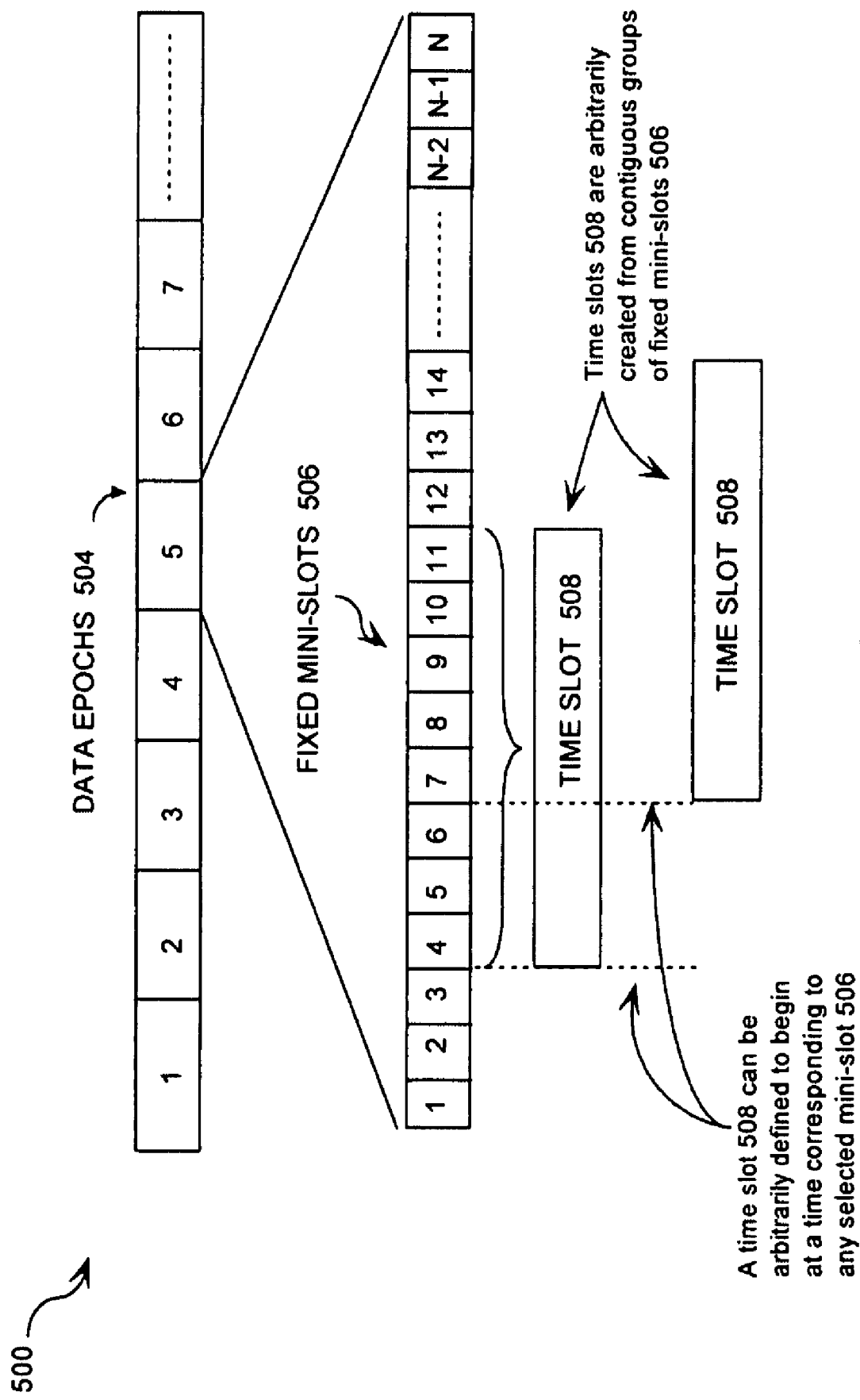
FIG. 5 is a timing diagram that is useful for understanding a timing relation between data epochs, mini-slots, and time slots.

In order to allow for time slots to have timing positions which are arbitrarily defined within an epoch, the present invention introduces the concept of mini-slots, which are some fraction of the duration of a time slot. For example, each mini-time slot can have a duration which is ⅛ of the duration of a time slot. This concept can be better understood with reference to FIG. 5. In FIG. 5, there is shown a timing diagram 500 for a TDMA type mobile ad hoc network according to the inventive arrangements. The timing diagram shows a series of data epochs 504 which are fixed divisions of time. Each epoch 504 is sub-divided into a plurality of N mini-slots 506. According to an embodiment of the invention, a time slot 508 can be comprised of contiguous groups of M mini-slots. For example, each time slot 508 can be comprised of 8 mini-slots 506 (M=8). Each time slot 508 can have an arbitrarily defined starting position (subject to interference calculations) that corresponds to a starting time of any selected mini-slot.

Figure 6:
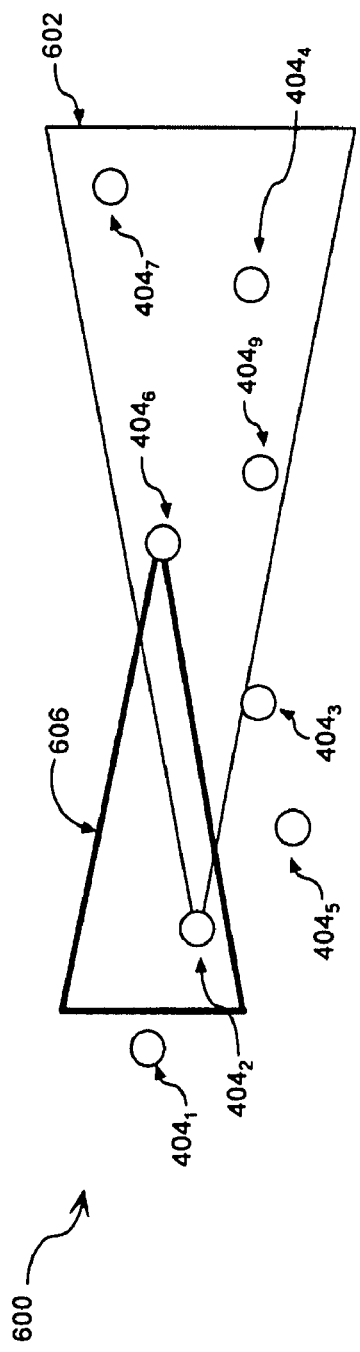
FIG. 6 is a drawing that shows a planar geometry of several nodes which is useful for understanding the invention.

In order to understand how time slot timing, range, direction and propagation information is used to mitigate interference, an example is useful. FIG. 6 shows a planar geometry of several nodes where node $404_2$ (the transmitting node) is attempting to schedule a transmit time slot consisting of five mini-slots (M=5) with node $404_4$ (the receiving node). In FIG. 6, the transmit beam pattern 602 is shown for node 2. Nodes $404_4$, $404_6$, $404_7$ and $404_9$ are located within range and in the beam pattern. A time slot scheduler can be used to automatically select a timing position for a transmit time slot that will minimize interference to neighboring nodes.

Figure 7:
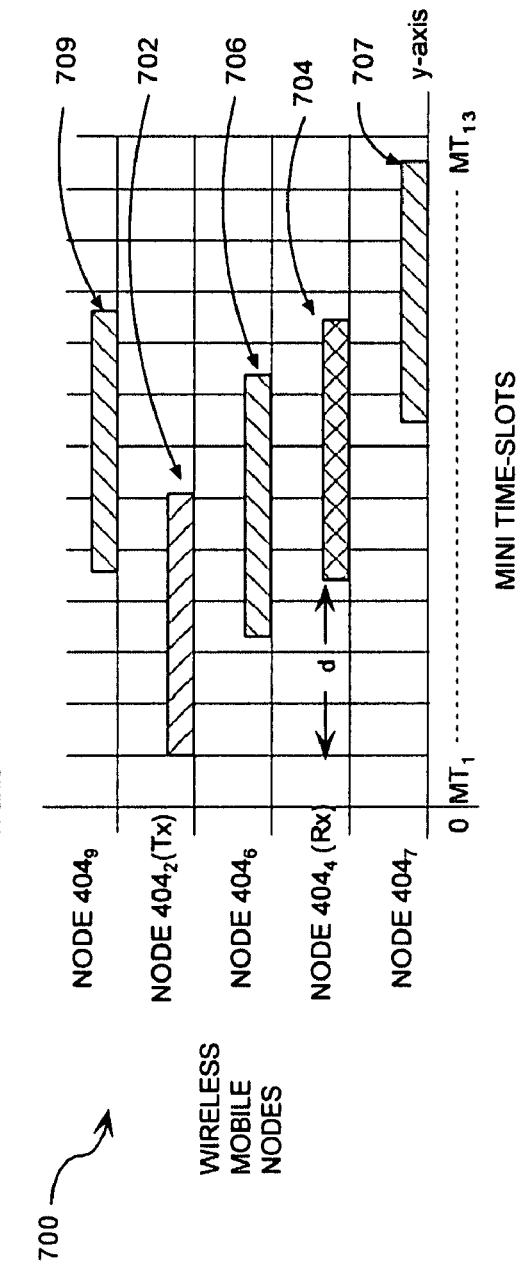
FIG. 7 is a timing diagram that is useful for understanding potential sources of interference in FIG. 6.

The scheduler process begins by selecting a candidate set of mini-slots which will define the position of the transmit time slot for node $404_2$. FIG. 7 is a timing diagram 700 which shows the time base at nodes $404_2$, $404_4$, $404_6$, $404_7$ and $404_9$.

It is assumed that clocks 414 at the nodes $404_1$-$404_9$ are synchronized to fractions of a mini-slot.

The timing diagram shows that a candidate set of mini-slots $MT_2$-$MT_6$ can be selected at node $404_2$ which define a possible timing position for time slot 702. In order to determine whether this timing position will cause interference with neighboring nodes, the timing position of time slot 702 is mapped to the corresponding time intervals at nodes $404_4$, $404_6$, $404_7$ and $404_9$. These corresponding time intervals 704, 706, 707, 709 are offset from time slot 702 because of the propagation delay "d" between the nodes. Propagation delay can be determined if the transmitting node $404_2$ knows the relative position of neighbor nodes $404_6$, $404_7$ and $404_9$. The corresponding time interval for the receiver node $404_4$, is 704. The corresponding time intervals mapped to the location of nodes $404_6$, $404_7$ and $404_9$ are respectively 706, 707, 709. Time intervals 706, 707, 709 represent the time intervals at nodes $404_6$, $404_7$ and $404_9$ during which the signal will arrive from node $404_2$ if transmitted during time slot 702.

It should be understood that during the time intervals 706, 707, 709, a transmitted signal from node $404_2$ will cause interference at nodes $404_6$, $404_7$ and $404_9$ if the antenna beams of these nodes are pointed in the direction of transmitting node $404_2$. For example, it can be observed that transmitting node $404_2$ can be within a receive antenna beam 606 of node $404_6$ during a transmit time interval. Notably, transmitting node $404_2$ can advantageously be provided with position and timing schedule for neighbor nodes to determine the direction in which its neighbor node antennas are pointing during each mini-slot. If transmitting node $404_2$ determines that any one of nodes $404_6$, $404_7$ and $404_9$ are in fact scheduled to receive signals (1) from a direction which coincides with transmitting node $404_2$, and (2) such signals are scheduled to be received during the intervals 706, 707, 709, then it can conclude that the transmissions from node $404_2$ during time slot 702 will cause interference. If transmitting node determines that interference will occur, then a different candidate time slot 702 is advantageously selected.

Figure 8:
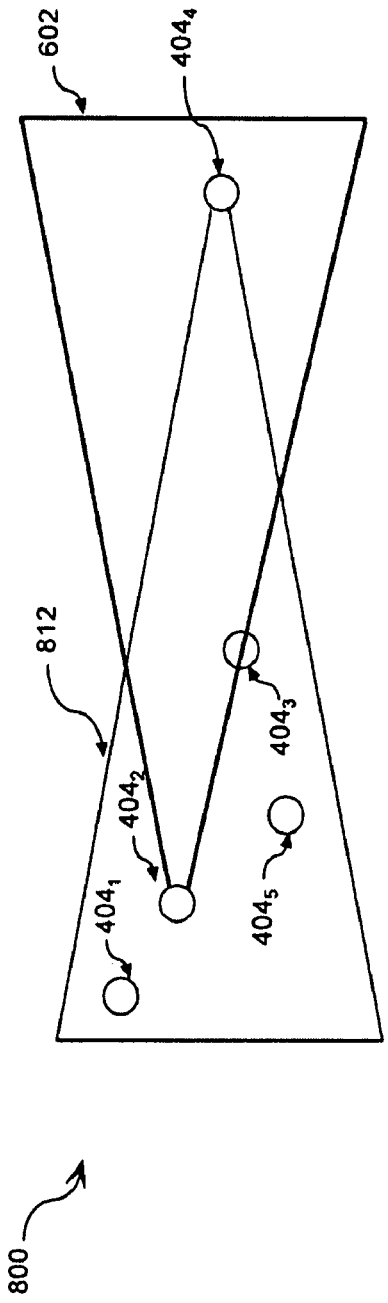
FIG. 8 is a drawing that shows the planar geometry of several nodes in FIG. 6 with different antenna pattern overlays.
Figure 9:
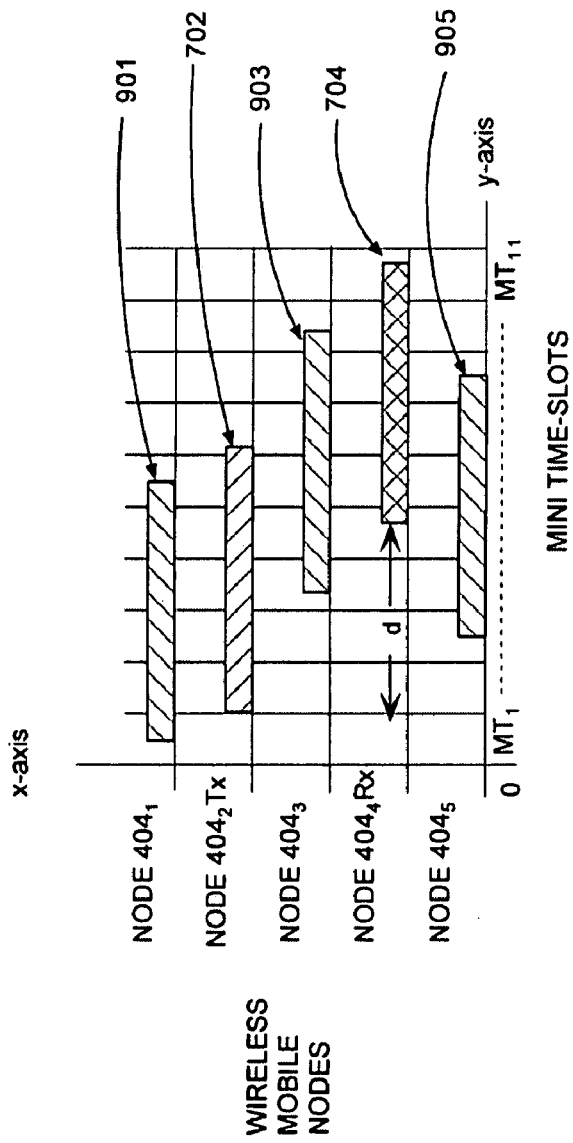
FIG. 9 is a timing diagram that is useful for understanding potential sources of interference in FIG. 8.

If node $404_2$ determines that time slot 702 will not cause interference to the receivers of nodes $404_6$, $404_7$ and $404_9$ then a second analysis can be performed. This second analysis can determine whether any nodes in the antenna beam of receiver node $404_4$ will be transmitting in the direction of node $404_4$ during the time interval corresponding to time slot 702 (as adjusted for propagation delay). This analysis is shown in FIGS. 8 and 9. FIG. 8 shows a planar geometry 800 which is similar to the one shown in FIG. 6. However, in FIG. 8, nodes $404_6$, $404_7$ and $404_9$ are omitted for greater clarity since they are not part of this analysis. It can be observed in FIG. 8 that nodes $404_1$, $404_2$, $404_3$ and $404_5$ are located within the range and in the receiver beam pattern 812 of node $404_4$.

FIG. 9 shows a timing diagram which includes segment of the time base at several nodes $404_1$-$404_5$. It is assumed that clocks 414 at the nodes $404_1$-$404_4$ are synchronized to fractions of a mini-slot. In FIG. 9, the timing position of time interval 704 is mapped to the corresponding time intervals at nodes $404_1$, $404_3$, and $404_5$. These corresponding time intervals 901, 903, 905 are offset from time slot 704 because of the propagation delay "d" between the nodes. FIG. 9 shows that node $404_4$ will experience interference during time interval 704 if nodes $404_1$, $404_3$, or $404_5$ transmit toward node $404_4$ during time periods 901, 903, or 905. If node $404_4$ has transmission schedules and position information for nodes $404_1$, $404_3$, or $404_5$ then it can determine whether time interval 704 is an acceptable receive time for node $404_4$. In the same way, node $404_4$ can determine whether time interval 702 is an acceptable transmit time slot for node $404_2$.

Figure 10:
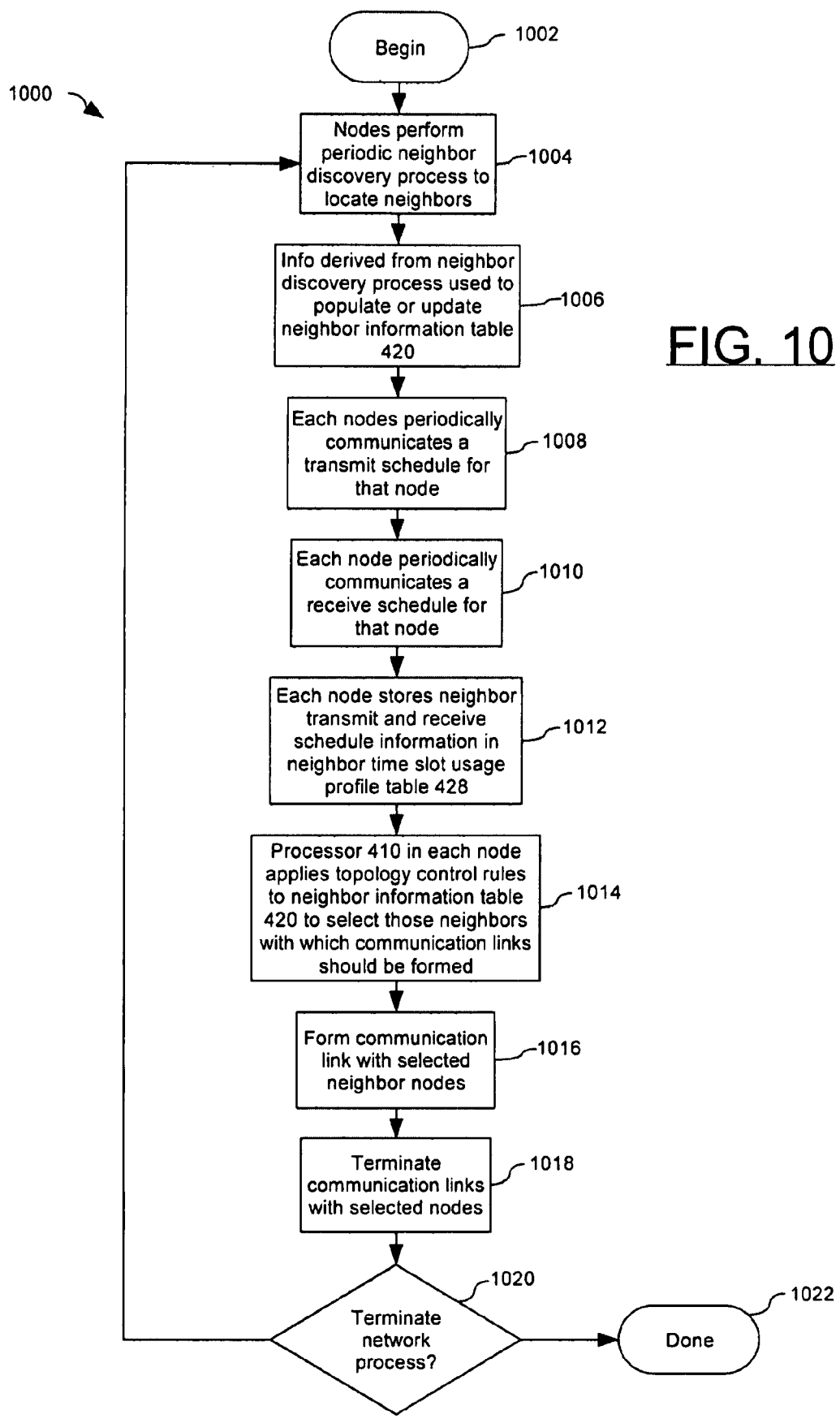
FIG. 10 is a flowchart that is useful for understanding an interaction among various nodes in a mobile ad hoc network.

The flowcharts in FIGS. 10-14 will now be used to explain how the concepts discussed above in relation to FIGS. 6-9 can be applied in a mobile ad hoc network. FIG. 10 provides a basic overview of a mobile ad hoc network process 1000. It will be understood that the scheduler process described in relation to FIGS. 6-9 requires detailed information regarding the identification, position, and communication schedule of neighbor nodes. Process 1000 is useful for understanding how such information is exchanged. Still, it should be understood that the process 1000 merely discloses one possible process for exchange of such data and the invention is not intended to be so limited. Instead, any other process for exchanging node identification, position, and communication schedule can be used. Further, it should be understood that all of the foregoing information can be exchanged using one or more control channels. For example, one or more mini-slots can be defined as control channels which are reserved for exchange of such information.

The process 1000 begins in step 1002 and continues with step 1004. In step 1004, nodes in a network engage in a neighbor discovery process. Neighbor discovery processes in mobile ad hoc networks are generally well known. Accordingly, the details of this process will not be described here. However, it should be understood that the neighbor discovery process involves transmission of "hello" messages to neighboring nodes using a control channel. The "hello" message can be broadcast to neighboring nodes by any suitable means. For example, the "hello" message can be transmitted by using an omni-directional antenna 402 or a scanned beam provided by directional antenna 404.

The "hello" message can include node identifier information and a position report for the node which transmits the message. Each node determines its own position using the node position unit 416. Each node also collects identifying information and position information from its neighbors using these "hello" messages.

In step 1006, information derived from the neighbor discovery process in step 1004 is used to populate (and/or update) neighbor information tables at each node. For example, node identification and position information can be stored in a neighbor information table 420. Each node further maintains an epoch schedule 422 which provides timing information for the occurrence of each data epoch 504. Timing of mini-slots 506 can also be derived from the epoch schedule 422.

The network process 1000 continues with step 1008 in which each node periodically communicates to its neighbors a transmit schedule for that node. In step 1010, each node also periodically broadcasts to its neighbors a receive schedule for that node. In step 1012, each node stores neighbor transmit and receive information in the table in FIG. 4 identified as the neighbor time slot usage profile 428.

The process continues in step 1014 in which each node uses processor 410 to apply topology control rules to the information stored in its neighbor information table 420. The topology control rules can be stored in memory device 450. The topology control rules are used to select one or more neighbor nodes with which communication links should be established. Topology control rules for mobile ad hoc networks are well known in the art and therefore will not be described here in detail. However, it should be understood that such topology control rules can allow a node to determine whether communication links with various neighbor nodes should be established, maintained, or terminated.

In step 1016, new communication links are formed with selected neighboring nodes as determined by the topology control rules. This process of forming links with new nodes will be described in more detail in relation to FIGS. 11-14. In step 1018, certain communication links are terminated with selected neighbor nodes as determined by topology control rules. In step 1020, a determination is made as to whether the network process should be terminated for any reason. If so, then the process terminates in step 1022. Alternatively, the process continues with step 1004 and repeats.

Figure 11:
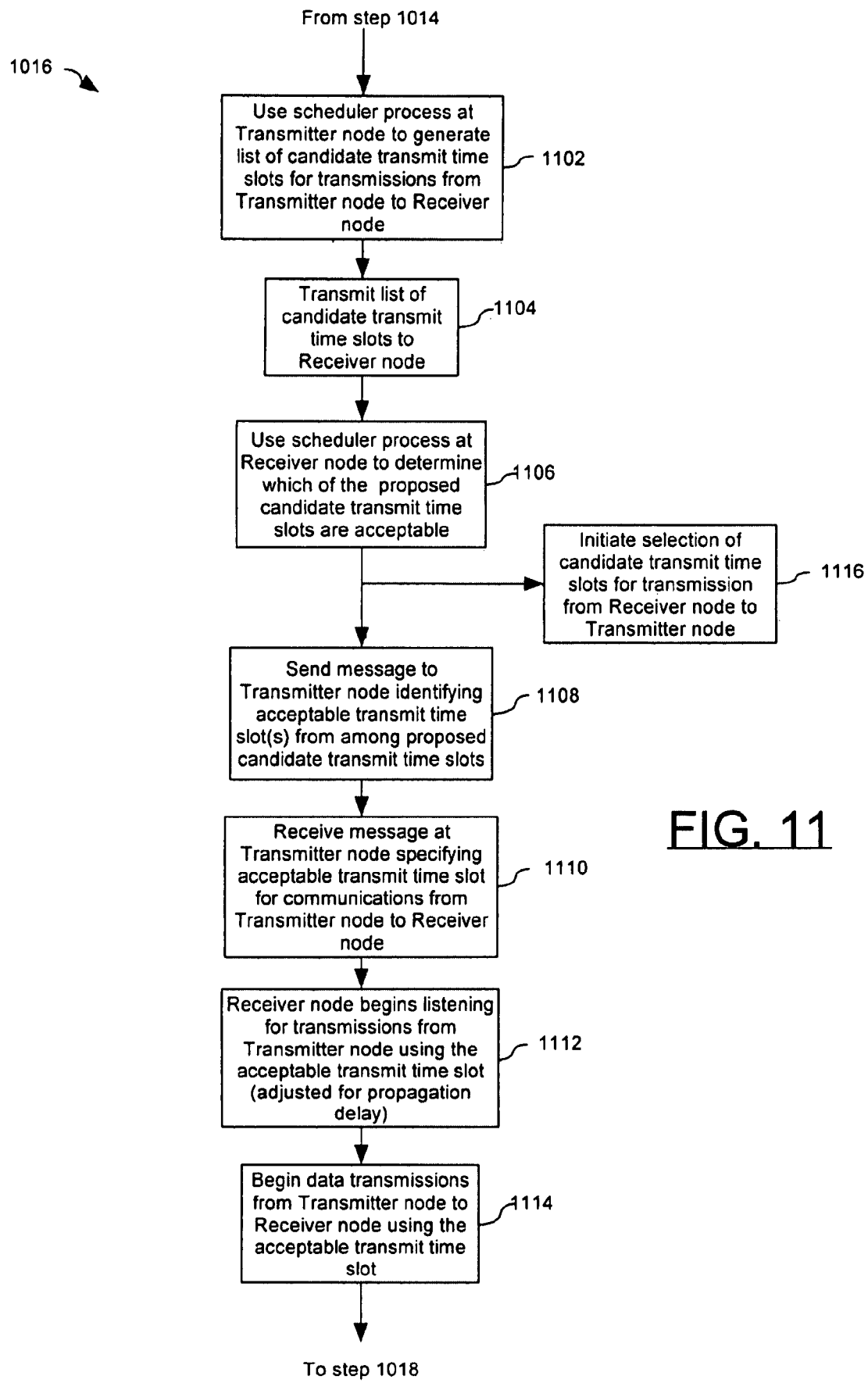
FIG. 11 is a flowchart that provides additional detail relating to step 1016 in FIG. 10.

FIG. 11 shows a series of steps which provide further detail concerning step 1016 in FIG. 10. Step 1016 involves one node forming a communication link with a selected neighbor node. Establishing this communication link begins with selection of a suitable time slot when a first node (transmitter node) will transmit data to a second node (receiver node).

As shown in FIG. 11, step 1016 includes a series of steps which can begin with step 1102. Step 1102 includes using a scheduler process at the transmitter node to generate a list of candidate transmit time slots for transmissions from the transmitter node to the receiver node. The scheduler process can be performed by processor 410 executing a programmed set of instructions. Alternatively, the scheduler process can be implemented as any other combination of hardware and software. Step 1102 is described in greater detail in FIG. 12. In general, however, the list of candidate time slots can be generated using an interference analysis similar to that described in relation to FIGS. 6-7. In this regard it may be noted that in FIGS. 6 and 7 the transmitter node was node $404_2$ and the receiver node was $404_4$.

In step 1104, the list of candidate transmit time slots can be communicated from the transmitter node to the receiver node. Any suitable means can be used for communicating this candidate transmit time slot list from the transmitter node to the receiver node. For example, a dedicated control channel can be used for this purpose. Still, the invention is not limited in this regard.

In step 1106, the candidate transmit time slot list is received and used at the receiver node to determine which of the proposed candidate time slots are acceptable. Step 1106 is described in greater detail in FIG. 13. In general, however, acceptable candidate time slots can be determined using a process similar to that previously described in relation to FIGS. 8-9. Following steps 1106, the receiver node will now be aware that transmitter node wishes to establish a transmit time slot for communications to receiver node. Consequently, the receiver node can initiate another process similar to that described in step 1016 for the purpose of establishing a transmit time slot for communications from the receiver node to the transmitter node. To avoid redundancy, that process will not be described here.

Continuing on now with step 1108, a message can be sent from the receiver node to the transmitter node. The message identifies those transmit time slots proposed by the transmitter node which are determined to be acceptable to the receiver node. In step 1110, this message is received at transmitter node. The process continues on to step 1112 in which the receiver node begins listening for transmissions from the transmitter node during the time slot which has been accepted by the transmitter node. In step 1114 data transmissions can begin from the transmitter node to the receiver node using the time slot that has been selected. Thereafter, the process can continue on to step 1018 as previously described.

Figure 12:
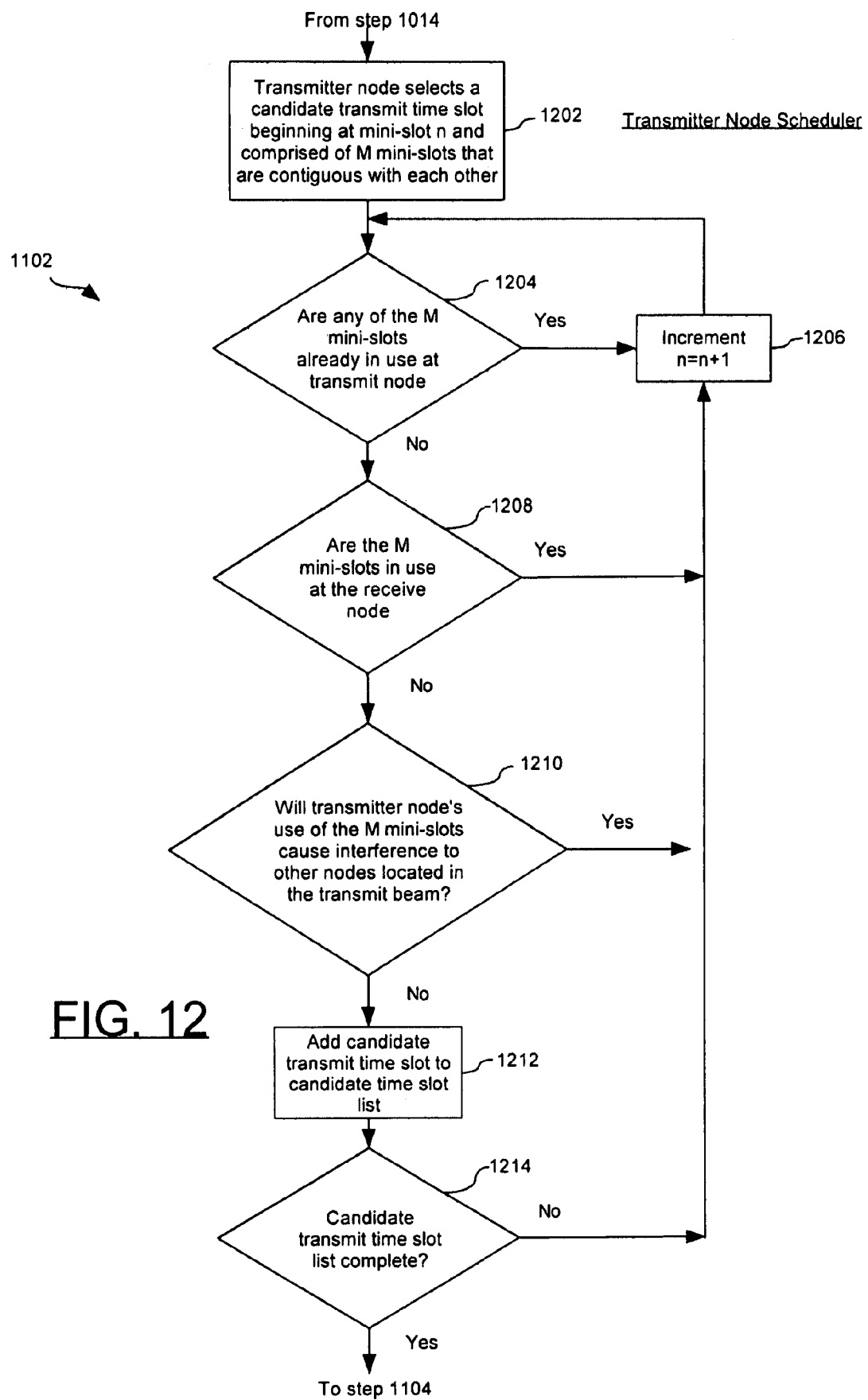
FIG. 12 is a flowchart that provides additional detail relating to step 1102 in FIG. 11.
Figure 13:
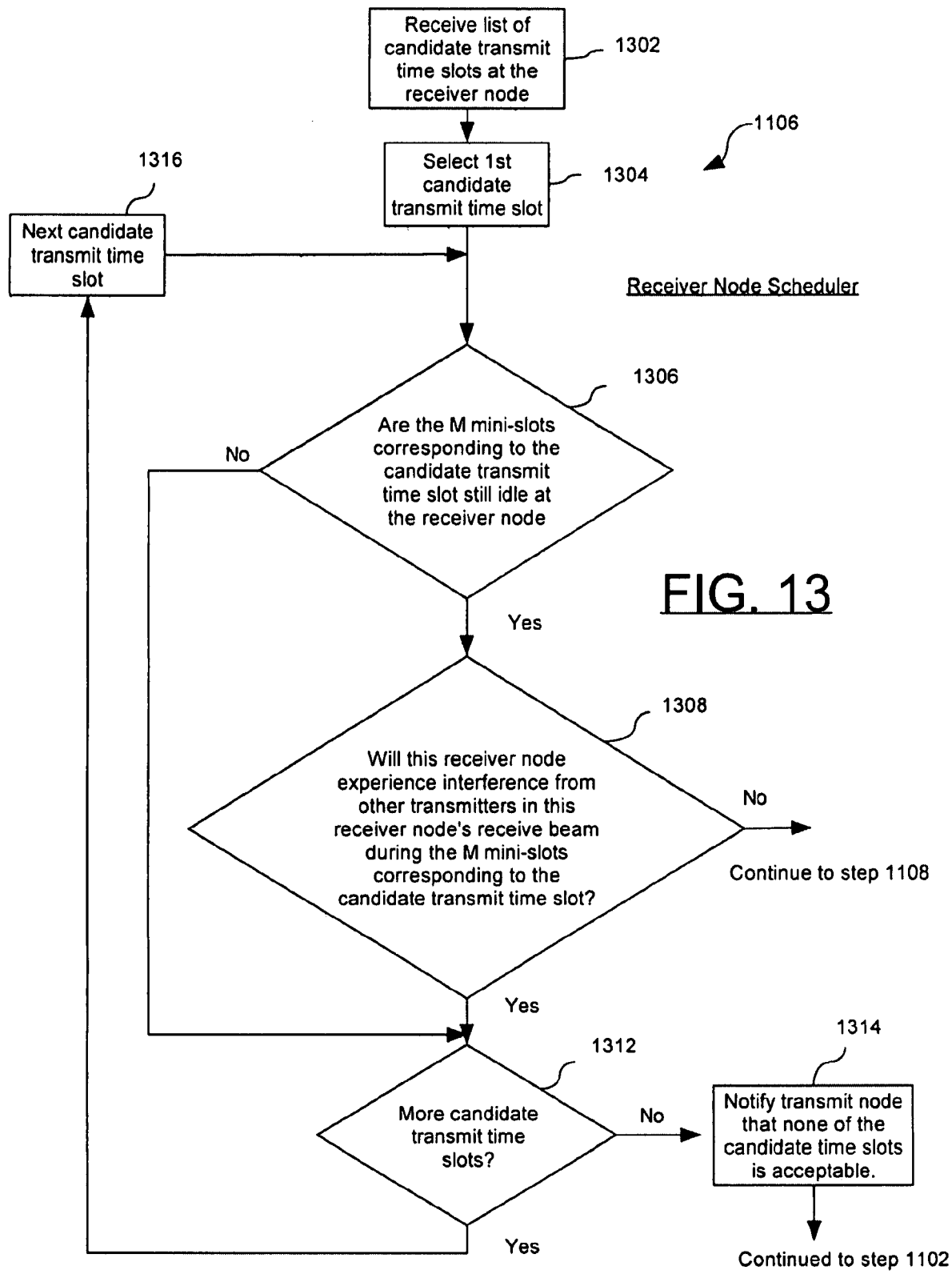
FIG. 13 is a flowchart that provides additional detail relating to step 1106 in FIG. 11.

Referring now to FIG. 12, there is provided a more detailed description of the processes associated with step 1102 in FIG. 11. Step 1102 involves using a scheduler process at the transmitter node to generate a list of candidate transmit time slots for transmissions from the transmitter node to the receiver node. As an aid to understanding, step 1102 will be described with reference to FIG. 5.

The process can begin with step 1202 in which the scheduler process at the transmitter node selects a candidate transmit time slot beginning at mini-slot n and comprised of M mini-slots that are contiguous with each other. For example, in FIG. 5 a candidate time slot can be time slot 508 which begins at mini-slot 4 and continues through mini-slot 11 (M=8). In step 1204, the scheduler process checks the transmitter node's transmit and receive schedule to determine whether any of the M mini-slots comprising the candidate time slot is already in use at the transmit node (for receiving or transmitting). The transmitter node's transmit and receive schedule can be stored in memory 450. If any of the M mini-slots are currently in use, then the candidate time slot is not acceptable and the process continues to step 1206. In step 1206, the value of n is incremented and the step 1204 is repeated with a different set of M mini-slots. For convenience, the value of n can be incremented by 1. However, the invention is not limited in this regard. For example, the value of n could be incremented by M or any other value.

In step 1204, if none of the M mini-slots are currently in use at the transmitter node, then the process continues on to step 1208. In step 1208, the scheduler process determines whether any of the M mini-slots are in use at the receiver node. Information concerning time slot usage at the receive node can be obtained from the neighbor time slot usage profile 428 which is stored in memory device 450. If any of the time slots are currently in use at the receiver node, the process can return to step 1206 where the value of n is incremented to select a different set of M mini-slots. Alternatively, if the M mini-slots are not in use at the receiver node, then the process continues on to step 1210.

In step 1210, the scheduler process in the transmitter node determines whether the transmitter node's use of the M mini-slots associated will cause interference to neighboring nodes located in the transmit beam of the transmitter node (when pointed toward the receiver node). This process for mitigating interference is described below in more detail in relation to FIG. 14. If the scheduler process determines that use of the M mini-slots by the transmitter node will cause interference to neighboring nodes, then the process returns to step 1206 and an alternative set of mini-slots is selected for evaluation. Conversely, if the scheduler process determines that use of the M mini-slots by the transmitter node will not cause interference to neighboring nodes, then the process continues on to step 1212.

In step 1212, the candidate time slot comprised of the M mini-slots is added to a list of candidate time slots which can be used. Thereafter, in step 1214, a determination is made as to whether the candidate transmit time slot list is complete. This determination can be based on any one of several considerations. For example, the list can be deemed complete when a predetermined number of candidate transmit time slots have been identified. Alternatively, the list can be complete when all possible candidate time slots have been considered.

Figure 14:
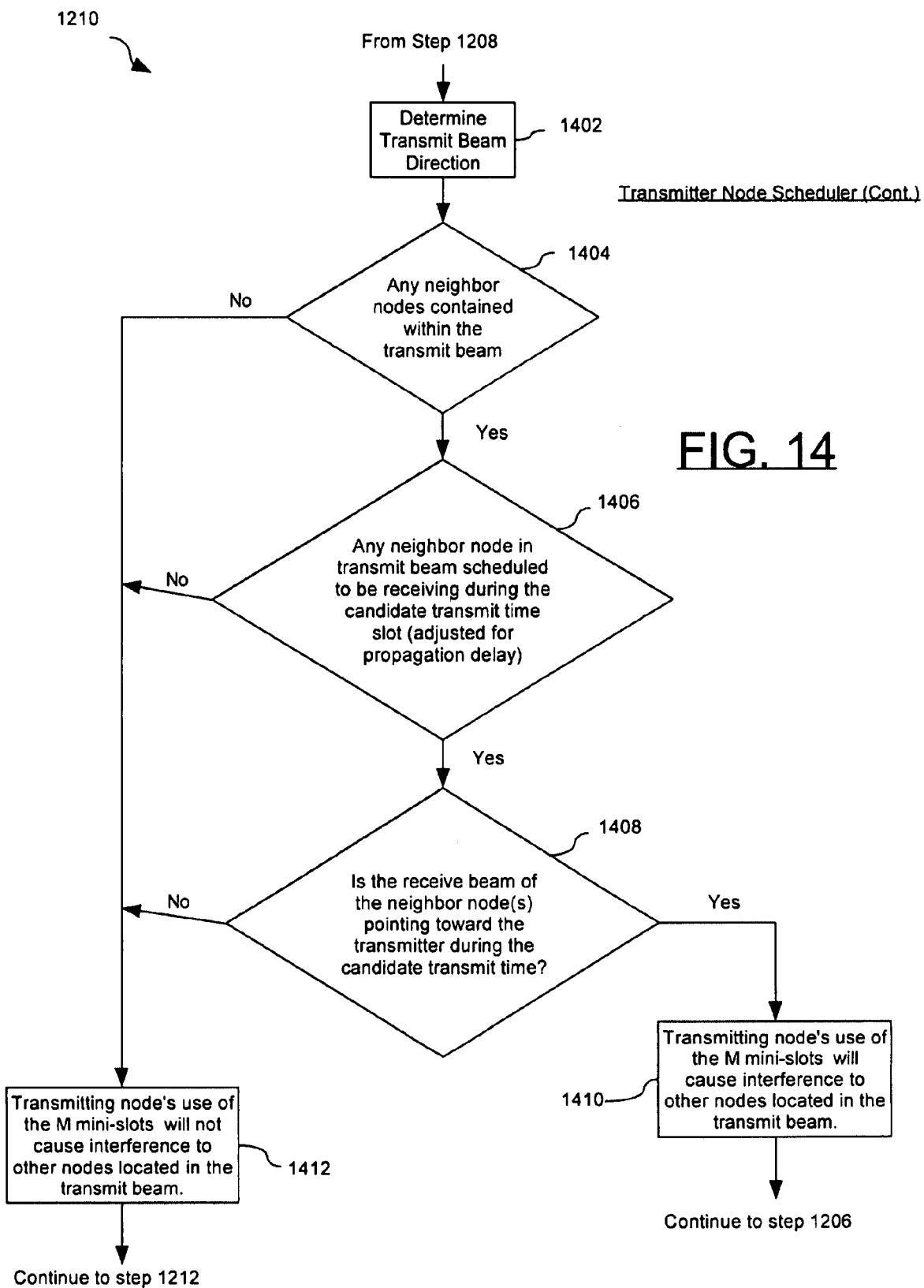
FIG. 14 is a flowchart that provides additional detail relating to step 1210 in FIG. 12.

Referring now to FIG. 14, there is provided a more detailed description of the process associated with step 1210 in FIG. 12. It may be recalled from the discussion regarding FIG. 12, that step 1210 generally involves a scheduler process at the transmitter node. The scheduler process is used to evaluate potential interference caused by the transmitting node's use of the M mini-slots associated with the candidate time slot. In particular, this scheduler process determines whether the transmissions by the transmitter node during the candidate time slot, using an antenna beam pointing toward the receiver node, will cause interference to other neighboring nodes that are also located in the transmit beam. As an aid in understanding, the process will be described with reference to FIGS. 6 and 7 in which node $404_2$ is considered the transmitter node and node $404_4$ is considered to be the receiver node.

The process in FIG. 14 begins with step 1402 in which the transmitter scheduler at the transmitter node determines a direction that it's transmit beam will be pointed for the purpose of communicating with the receiver node. In the context of FIGS. 6 and 7, this means that the node $404_2$ will determine which direction its antenna beam 602 should point for communications with node $404_4$. Once the direction of the transmitter beam has been determined in step 1402, the scheduler process at the transmitter node ($404_2$) will determine in step 1404 whether there are any neighbor nodes that are contained within the transmit beam. If not, then it can be assumed that the transmitter node's use of the M mini-slots will not cause interference to any other nodes and the process will continue on to step 1412.

Alternatively, if it is determined in step 1404 that there are neighbor nodes contained within the transmit beam, then the process continues on to step 1406. For example, in FIG. 6 nodes $404_6$, $404_7$, $404_9$ are in the transmit beam 602 (in addition to node $404_4$). In step 1406 the scheduler process determines whether there are any neighbor nodes in the transmit beam that are scheduled to be receiving during the candidate transmit time slot as adjusted for propagation delay. This concept is illustrated in FIG. 7. In step 1406, the transmitter scheduler would determine whether any of the nodes $404_6$, $404_7$, $404_9$ are scheduled to be receiving during time intervals 706, 707, 709. If not, then it can be assumed that no interference will occur and the scheduler process continues on to step 1412. Otherwise, the scheduler process goes on to step 1408.

In step 1408, a determination is made as to whether any of the receive beam of the neighbor nodes is pointing toward the transmitter during the candidate transmit time (adjusted for propagation delay). In the context of FIG. 7, this would mean determining whether the antenna beams of any of the nodes $404_6$, $404_7$, $404_9$ are pointing toward the transmitter node $404_2$. In FIG. 6, it can be observed that antenna beam 606 of node $404_6$ is pointing toward the transmitter node $404_2$ during time interval 706. In this example, the scheduler process would continue on to step 1410 and determine that the transmitter node's use of the M mini-slots associated with a particular candidate time slot will cause interference to the other nodes located in the transmit beam. The process would then continue on to step 1206 in FIG. 12. Alternatively, the scheduler process continues to step 1412 and determine that the transmitter node's use of the M mini-slots will not cause interference. From step 1412, the process continues on to step 1212 where the candidate time slot is added to the candidate time slot list.

It may be recalled from FIG. 11 that once a suitable list of candidate transmit time slots has been compiled in step 1102, this list is communicated to the receiver in step 1104. Thereafter, in step 1106 the scheduling process at the receiver determines which, if any, of the candidate time slots are acceptable. Step 1106 will now be described in further detail with reference to FIG. 13. The process can begin in step 1302 when the receiver scheduler receives the list of candidate transmit time slots at the receiver node. The process continues on to step 1304 in which the receiver scheduler selects the first candidate time slot on the list for evaluation.

The evaluation process begins in step 1306 with the receiver scheduler process at the receiver node determining whether the M mini-slots corresponding to the candidate transmit time slot are still idle and are therefore available. This step is somewhat redundant because a similar check is performed in step 1208. However, it will be appreciated that the transmit and receive schedule at the receiver node will often contain scheduling information for the receiver mode that is more current than the corresponding information for the receiver node that is stored in at the transmitter node. Accordingly, step 1306 is a useful verification that the M mini-slots are still idle.

If the M mini-slots are determined to be no longer idle, then the process continues on to step 1312 where the receiver scheduler process determines whether there are any more candidate transmit time slots on the candidate transmit time slot list. Alternatively, in step 1306, if the M mini-slots associated with a candidate time slot are in fact available, then the process continues on to step 1308.

In step 1308, the receiver scheduler process at the receiver node determines whether the receiver node will experience interference from network nodes other than the transmitter node. Step 1308 is described in greater detail in relation to FIG. 15. However, it should be understood that the receiver scheduler process in step 1308 determines whether the receiver node will experience interference from other neighboring nodes during the M mini-slots corresponding to the candidate transmit time slot (as adjusted in time to compensate for propagation delay). If, in step 1308, the receiver scheduler process determines that no interference will result from neighboring nodes, then the process continues on to step 1108 in FIG. 11. In step 1108, a message is sent to the transmitter node indicating that the candidate time slot is acceptable to the receiver node. Alternatively, if the receiver scheduler process determines that the receiver node will experience interference from other neighboring nodes, then the process continues on to step 1312.

In step 1312, the receiver scheduler process determines whether there are any other candidate time slots on the candidate time slot list. If so, then the receiver scheduler process continues on to step 1316 where the next candidate time slot is selected. Alternatively, if there are no more candidate time slots on the list, the receiver scheduler process continues on to step 1314 in which the receiver node notifies the transmitter node that none of the candidate time slots are acceptable. The receiver scheduler process then returns to step 1102 in FIG. 11, where a new list of candidate time slots is generated at the transmitter node.

Figure 15:
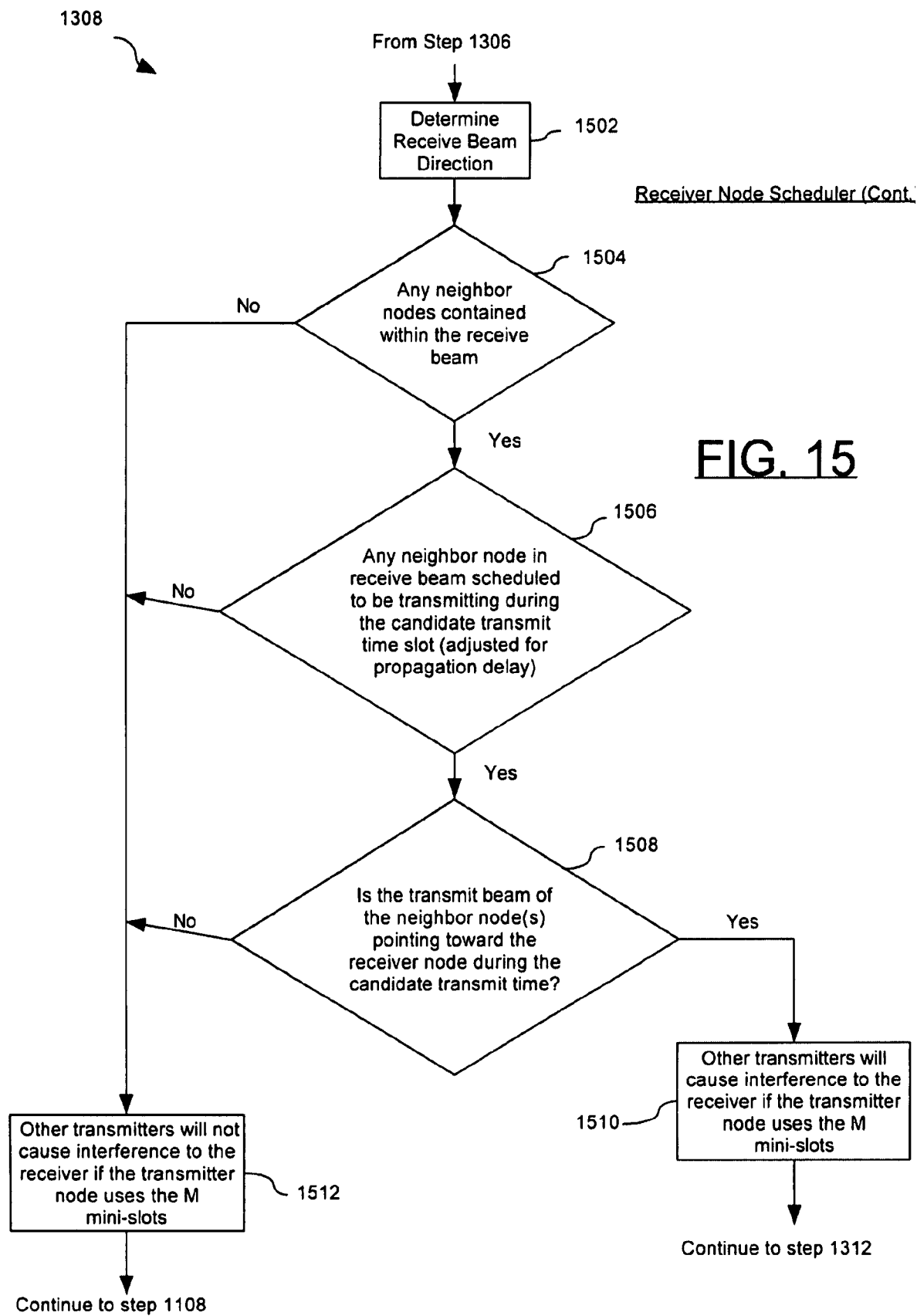
FIG. 15 is a flowchart that provides additional detail relating to step 1308 in FIG. 13.

Referring now to FIG. 15, the processes associated with step 1308 will now be described in greater detail. The process in FIG. 15 begins with step 1502 in which the scheduler process at the receiver node determines a direction that it's receive beam will be pointed for the purpose of receiving communications from the transmitter node. In the context of FIGS. 8 and 9, this means that the node $404_4$ will determine which direction its receiver antenna beam 812 will need to point towards for communications with node $404_2$. Once the direction of the receiver antenna beam 812 has been determined in step 1502, the scheduler process at the receiver node ($404_4$) will determine in step 1504 whether there are any neighbor nodes that are contained within the receiver antenna beam 812.

If it is determined in step 1504 that there are no neighbor nodes contained within the receiver antenna beam 812, then the process continues in step 1512. In step 1512, the scheduler process determines that the receiver node $404_4$ will not experience interference from other transmitting nodes during the time interval corresponding to the M mini-slots (as adjusted for propagation delay). Accordingly, the process will thereafter continue on to step 1108 in FIG. 11.

Alternatively, if it is determined in step 1504 that there are neighbor nodes contained within the receiver antenna beam 812, then the process continues on to step 1506. For example, in FIG. 8 nodes $404_1$, $404_3$, $404_5$ are in the receiver antenna beam 812 (in addition to node $404_2$). Accordingly, the process would continue on to step 1506 in the example shown in FIG. 8.

In step 1506 the scheduler process at the receiver node determines whether transmitted signals from any neighbor nodes in the receiver beam 812 can potentially be received at the receiver node $404_4$ during any of the mini-slots corresponding to the time interval 704. This concept is illustrated in FIG. 9. Recall that time interval 704 is the period of time during which a transmission from transmitter node $404_2$ will actually be received at receiver node $404_4$ (assuming that the signal is transmitted from node $404_2$ during time slot 702). Similarly, time intervals 901, 903, 905 represent those transmission time intervals for nodes $404_1$, $404_3$, $404_5$ that will result in signals actually being received at receiver node $404_4$ during time interval 704.

In step 1506, if none of the nodes $404_1$, $404_3$, $404_5$ are actually scheduled to be transmitting during the time periods 901, 903, 905, then it can be concluded that no interference will be caused at the receiver node $404_4$ during time interval 704. In that case, the transmit time slot 702 would be an acceptable time slot during which node $404_2$ can transmit to node $404_4$, and the scheduler process continues on to step 1512. Conversely, if any of the nodes $404_1$, $404_3$, $404_5$ are actually scheduled to be transmitting during the time periods 901, 903, 905, then such transmissions can potentially cause interference at the receiver node $404_4$ during time interval 704. In that case, the transmit time slot 702 may not be an acceptable time slot during which node $404_2$ can transmit to node $404_4$. Accordingly, the scheduler process will continue on to step 1508.

In step 1508, a determination is made as to whether an antenna beam of any neighbor nodes that is actually pointed toward the receiver $404_4$ during a time interval when the receiver is expecting to receive signals from the transmitter node. In the context of FIG. 9, this would mean determining whether the antenna beams of any of the nodes $404_1$, $404_3$, $404_5$ are pointing toward the receiver node $404_4$ during time intervals 901, 903, 905. If so, then the scheduler continues on to step 1510 where it determines that other transmitters will cause interference to the receiver if the transmitter node uses the M mini-slots associated with a candidate transmit time slot such as slot 702. Following step 1510, the scheduler process at the receiver node continues on to step 1312 in FIG. 13. In step 1312 the scheduler process checks to see if other candidate time slots are available and continues on as described above.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A method for scheduling time division multiple access (TDMA) communications among a plurality of peer nodes using directional antennas in a mobile ad hoc network, comprising:

arranging a plurality of peer nodes to form a wireless ad hoc mobile network, said peer nodes communicating with each other using directional antennas and a TDMA process;

automatically scheduling at least one transmit time slot during which a first one of said plurality of peer nodes transmits wireless data to a second one of said plurality of peer nodes;

wherein said scheduling step includes:

automatically selecting a candidate time slot for said transmit time slot, said candidate time slot having a first timing position within a data epoch comprising a plurality of mini-slots;

determining whether transmissions during said candidate time slot will (1) cause interference with communications of any of said plurality of peer nodes that are located in a defined transmit antenna beam of said first node, or (2) be subject to interference when received at said second node resulting from transmissions from any of said plurality of peer nodes located in a defined receive antenna beam of said second node; and automatically selecting a second timing position within said data epoch for said candidate time slot if it is determined that said candidate time slot will cause or be subject to said interference, said second timing position being different than said first timing position; and wherein said candidate time slot includes any contiguous group of said plurality of mini-slots having an arbitrary starting position within said data epoch.

2. The method according to claim 1, further comprising:

defining said data epoch for said TDMA process, said data epoch comprising a recurring time period which defines an overall timing cycle for said TDMA process;

sub-dividing said data epoch in time to form a plurality of mini-slots, each comprising a fractional duration of said data epoch; and selecting said candidate time slot to have a duration which comprises M mini-slots.

3. The method according to claim 1, wherein said scheduling step further comprises automatically selecting a receive time slot for said second node corresponding to a time of said transmit time slot, but automatically adjusted in time to compensate for a propagation delay between said first node and said second node.

4. The method according to claim 3, wherein said second node automatically determines said receive time slot exclusive of any centralized controller for said mobile ad hoc network.

5. The method according to claim 3, wherein said receive time slot comprises a different contiguous group of mini-slots as compared to said transmit time slot.

6. The method according to claim 1, wherein said scheduling step is cooperatively performed at least at said first node and said second node.

7. The method according to claim 1, further comprising a second scheduling step which includes scheduling at least a second transmit time slot for said second one of said plurality of peer nodes to transmit wireless data to said first one of said plurality of peer nodes using a distributed process.

8. The method according to claim 7, wherein said second scheduling step includes automatically selecting a second candidate time slot for said second transmit time slot and determining whether transmissions during said second candidate time slot will (1) cause interference with communications of any of said plurality of peer nodes that are located in a defined transmit antenna beam of said second node, or (2) be subject to interference when received at said first node resulting from transmissions from any of said plurality of peer nodes located in a defined receive antenna beam of said first node.

9. A method for scheduling time division multiple access (TDMA) communications among a plurality of peer nodes using directional antennas in a mobile ad hoc network, comprising:

arranging a plurality of peer nodes to form a wireless ad hoc mobile network that communicate with each other using directional antennas and a TDMA process;

automatically selecting a transmit time slot for a first node of said plurality of peer nodes, said transmit time slot having a first timing position within a data epoch comprising a plurality of mini-slots;

determining whether transmissions during said transmit time slot will cause or be subject to interference;

automatically selecting a second timing position within said data epoch for said transmit time slot if it is determined that said transmit time slot will cause or be subject to said interference, said second timing position being different than said first timing position;

automatically scheduling for said first node said transmit time slot for transmitting wireless data to a second node of said plurality of peer nodes; and automatically scheduling for said second node a receive time slot for receiving signals transmitted from said first node during said transmit time slot, said receive time slot corresponding to a time of said transmit time slot, but automatically adjusted in time to compensate for a propagation delay between said first and second nodes;

wherein said candidate time slot includes any contiguous group of said plurality of mini-slots having an arbitrary starting position within said data epoch.

10. The method according to claim 9, wherein said determining step further comprises determining whether transmissions during said transmit time slot will (1) cause interference with communications of any of said plurality of peer nodes that are located in a defined transmit antenna beam of said first node, or (2) be subject to interference when received at said second node resulting from transmissions from any of said plurality of peer nodes located in a defined receive antenna beam of said second node.

11. The method according to claim 9, further comprising:

defining said data epoch for said TDMA process, said data epoch comprising a recurring time period which defines an overall timing cycle for said TDMA system;

sub-dividing said data epoch in time to form a plurality of mini-slots, each comprising a fractional duration of said data epoch; and selecting said transmit time slot to have a duration which comprises M mini-slots.

12. A distributed system for scheduling time division multiple access (TDMA) communications among a plurality of peer nodes using directional antennas in a mobile ad hoc network, comprising:

a plurality of peer nodes arranged to form a wireless ad hoc mobile network that communicate with each other using directional antennas and a TDMA process;

a scheduling means operating at each node of said plurality of peer nodes and configured for cooperatively scheduling at least one transmit time slot during which a first node of said plurality of peer nodes transmits wireless data to a second node of said plurality of peer nodes;

wherein said scheduling means is further configured to:

automatically select a candidate time slot for said transmit time slot, said candidate time slot having a first timing position within a data epoch comprising a plurality of mini-slots; and determine whether transmissions during said candidate time slot will (1) cause interference with communications of any of said plurality of peer nodes that are located in a defined transmit antenna beam of said first node, or (2) be subject to interference when received at said second node resulting from transmissions from any of said plurality of peer nodes located in a defined receive antenna beam of said second node; and automatically select a second timing position within said data epoch for said candidate time slot if it is determined that said candidate time slot will cause or be subject to said interference, said second timing position being different than said first timing position;

wherein said candidate time slot includes any contiguous group of said plurality of mini-slots having an arbitrary starting position within said data epoch.

13. The system according to claim 12, wherein:

said TDMA process includes a data epoch comprising a recurring time period which defines an overall timing cycle for said TDMA process;

each data epoch is sub-divided in time to form a plurality of mini-slots, each comprising a fractional duration of said data epoch; and said scheduling means is configured for selecting said candidate time slot to have a duration which comprises M mini-slots.

14. The system according to claim 12, wherein said scheduling means is further configured to automatically select a receive time slot for said second node corresponding to a time of said transmit time slot, wherein said receive time slot is automatically adjusted in time to compensate for a propagation delay between said first node and said second node.

15. The system according to claim 14, wherein said scheduling means at said second node automatically determines said receive time slot exclusive of any centralized controller for said mobile ad hoc network.

16. The system according to claim 14, wherein said receive time slot comprises a different contiguous group of mini-slots as compared to said transmit time slot.

* * * * *